(12) United States Patent
Matye et al.

(10) Patent No.: US 11,286,123 B2
(45) Date of Patent: Mar. 29, 2022

(54) CAMERA-ENABLED LOADER SYSTEM AND METHOD

(71) Applicant: DCL, Inc., Charlevoix, MI (US)

(72) Inventors: Reinhard Matye, Charlevoix, MI (US); Richard S. Anderson, Williamsburg, MI (US)

(73) Assignee: DCL, Inc., Charleviox, MI (US)

( * ) Notice: Subject to any disclaimer, the term of this patent is extended or adjusted under 35 U.S.C. 154(b) by 6 days.

(21) Appl. No.: 16/904,887

(22) Filed: Jun. 18, 2020

(65) Prior Publication Data

US 2020/0399079 A1 Dec. 24, 2020

Related U.S. Application Data

(60) Provisional application No. 62/864,048, filed on Jun. 20, 2019.

(51) Int. Cl.

| | |
|---|---|
| B65G 65/32 | (2006.01) |
| B65G 67/20 | (2006.01) |
| H04N 5/225 | (2006.01) |
| H04N 7/18 | (2006.01) |
| G06T 7/70 | (2017.01) |
| G06T 7/20 | (2017.01) |

(52) U.S. Cl.
CPC ............ *B65G 65/32* (2013.01); *B65G 67/20* (2013.01); *G06T 7/20* (2013.01); *G06T 7/70* (2017.01); *H04N 5/2253* (2013.01); *H04N 7/18* (2013.01); *B65G 2203/0283* (2013.01); *B65G 2203/041* (2013.01); *B65G 2203/042* (2013.01); *G06T 2207/10016* (2013.01)

(58) Field of Classification Search
None
See application file for complete search history.

(56) References Cited

U.S. PATENT DOCUMENTS

| | | |
|---|---|---|
| X840863 | 1/1907 | Patterson |
| X887805 | 5/1908 | Higgins |
| 3,241,243 A | 3/1966 | Speer |
| 3,307,267 A | 3/1967 | Barr et al. |
| 3,804,270 A | 4/1974 | Michaud et al. |
| 3,911,975 A | 10/1975 | van Soestbergen et al. |
| 3,924,666 A | 12/1975 | Raison |
| 3,944,090 A | 3/1976 | Flood |
| 4,065,005 A | 12/1977 | Mahle et al. |
| 4,102,637 A | 7/1978 | Shulman et al. |
| 4,141,394 A | 2/1979 | Lassman et al. |
| 4,224,968 A | 9/1980 | Bosser et al. |

(Continued)

*Primary Examiner* — James M Anderson, II
(74) *Attorney, Agent, or Firm* — Gardner, Linn, Burkhart & Ondersma LLP

(57) ABSTRACT

A bulk loading system for delivering bulk material to a storage compartment of a bulk transport vehicle through a hatch opening includes a movable positioner supporting an extendable loading spout assembly, a camera coupled to the positioner and a programmable logic controller communicatively coupled to the positioner, loading spout assembly and camera for automatically positioning the loading spout assembly over the hatch opening and filling the storage compartment of the vehicle with bulk material. The system provides accurate position information to a driver of the vehicle so that the vehicle and its storage compartments can be quickly positioned within a reach zone of the loading spout.

21 Claims, 5 Drawing Sheets

(56) References Cited

U.S. PATENT DOCUMENTS

| | | | |
|---|---|---|---|
| 4,386,344 A | | 5/1983 | Vecchiatto |
| 4,402,350 A | | 9/1983 | Ehret et al. |
| 4,460,308 A | | 7/1984 | Moon et al. |
| 4,819,702 A | | 4/1989 | Gerlach |
| 4,980,570 A | | 12/1990 | Yasunaga et al. |
| 5,303,034 A | | 4/1994 | Carmichael et al. |
| 5,319,442 A | | 6/1994 | Rosser |
| 5,323,327 A | | 6/1994 | Carmichael et al. |
| 5,372,229 A | | 12/1994 | Leibling |
| 5,415,512 A | | 5/1995 | Buchfink |
| 5,642,434 A | * | 6/1997 | Nakao ............... G06T 7/70 382/220 |
| 5,881,780 A | * | 3/1999 | Matye ............... B61D 5/008 141/232 |
| 2015/0360877 A1 | * | 12/2015 | Shin ............... G06T 7/70 382/103 |
| 2019/0061623 A1 | * | 2/2019 | Borkowski ......... G05D 1/0293 |

\* cited by examiner

CAMERA-ENABLED LOADER SYSTEM AND METHOD

CROSS REFERENCE TO RELATED APPLICATION

The present application claims the priority benefit of U.S. provisional application Ser. No. 62/864,048, filed Jun. 20, 2019, which is hereby incorporated herein by reference in its entirety.

FIELD OF THE INVENTION

The present invention relates to a system and method for locating a center in a structure such as a portable storage tank for liquids or flowable solids and, more particularly, to a system and method for automatically locating the center of an opening in a vehicle for loading bulk material into the vehicle through the opening.

BACKGROUND OF THE INVENTION

Liquids and flowable dry materials, such as gravel, ash, cement, coal, or chemicals, are often transported in bulk and contained in a storage compartment of a vehicle, such as a truck, train, or boat. The materials are delivered to the storage compartment of the vehicle through an extendable loading spout, which can be moved and aligned with a hatch or opening of the storage compartment of the vehicle by using a driver of the vehicle and a loading station operator of the loading facility controlling the driver.

Although these loading spouts can be moved and/or extended, their range of motion is limited. Therefore, the driver of the vehicle, guided by the loading station operator located in the loading area, must maneuver the vehicle into the loading area to bring the hatch in approximate alignment with the loading spout. Once the hatch is aligned and opened, the loading station operator guides the loading spout into the open hatch using conventional controls. If the vehicle has several storage compartments and/or several hatches, either the operator has to move and align the spout over the next hatch, given the spout has long enough range of motion, or have the driver move the vehicle again to align the next hatch with the loading spout. It can be appreciated, therefore, that the loading process, using these conventional techniques, is time consuming. Moreover, this process is often imprecise because the process may take several passes or adjustments to properly align the spout with the hatch opening. Even small inaccuracies or errors can result in misalignments that cause an increase in the downtime for the vehicle and decrease in the throughput for the loading facility, ultimately resulting in higher costs of the materials being transported.

SUMMARY OF THE INVENTION

The present invention provides an automated camera-based guidance system and method for aligning trucks and spout positioners into truck hatch openings. The centering and loading system and method of the present invention reduce the time required to locate the center of a fill opening of a vehicle, reduce the loading time to load bulk material into the vehicle through the opening, provide a more accurate alignment of the loading spout with the opening of the vehicle, and reduce the overall operating costs.

In one form of the present invention, a bulk loading system for delivering bulk material to a storage compartment of a bulk transport vehicle through a hatch opening includes (a) a movable spout support that is adapted to move in at least two horizontal directions of movement in order to center the movable spout support over the hatch opening of the transport vehicle, (b) a loading spout assembly that is supported by the spout support and adapted to move in two vertical directions of movement, (c) a camera that is coupled to the spout support for capturing and analyzing a plurality of images in real-time, and (d) a programmable logic controller (PLC) that is communicatively coupled to the spout support, the loading spout assembly, and the camera. The PLC is configured to actuate (i) the spout support so that the spout support is centered over the hatch opening of the vehicle and (ii) the loading spout assembly in order to fill the storage compartment of the vehicle with the bulk material.

In one aspect, the bulk loading system includes a display interface used by vehicle operators to view camera images and vehicle positioning instructions. The interface is configured to display camera images, PLC generated messages and image plotted graphics that the driver is able to use to properly position the vehicle.

In another aspect, the camera extends downwardly at an angle from the spout support and is angled towards the loading spout assembly. The camera, in response to an input received from the PLC, is configured to analyze the plurality of images captured by the camera for the purpose of identifying when the hatch opening of the vehicle moves within a predetermined range of reach of the spout support. Also, the camera and the PLC are configured to cooperate in order to analyze and determine, respectively, that the hatch opening is no longer moving, enabling the PLC to estimate, based on the determination, a horizontal direction of movement of the spout support.

In yet another aspect, the camera is configured to (i) locate and track a hatch opening by capturing and analyzing a real-time video imaging and (ii) dynamically transmit to the PLC a positioning of the hatch opening. The real-time video imaging is generated by rapid-triggering the camera to capture the plurality of images. The camera software includes object recognition tools that measure the area and width of a hatch opening.

In a further aspect, the PLC is configured to dynamically receive camera results, in the form of real-time video images captured by the camera, showing, for every image captured, the position of a hatch opening in the images. The PLC uses this position information for the hatch opening to determine when the vehicle is stopped and when positioning system can start moving. The PLC is configured to send outputs to the camera, including a trigger signal and a test identification number. The PLC is also configured to receive inputs from the camera including vehicle speed instructions, vehicle movement directions and spout movement directions.

In yet a further aspect, the bulk loading system includes LED lights mounted to the four corners of the positioner's support frame. These lights are pointed downward and inwards to the area around the hatch opening providing even camera image lighting levels on the top side of vehicle surfaces.

In another aspect, the bulk system includes a non-contact distance sensor that measures vehicle heights. The PLC is configured to analyze data received from the sensor to provide stable truck height calculations that are not affected by hatch covers, railings, steps, tubes and other truck top mounted objects. This height data is used to dynamically adjust truck alignment expectations and the spout drop position in the camera as trucks of varying heights are presented to the system.

According to another form of the present disclosure, a method for delivering bulk material to a storage compartment of a bulk transport vehicle through a hatch opening includes (a) providing a camera with programming software and object recognition algorithms used for artificial recognition of objects within captured images. The camera is communicatively coupled to a programmable logic controller (PLC); (b) capturing by the camera a plurality of images of the top surface of a vehicle; (c) analyzing by the camera the plurality of images to locate a positioning of the hatch opening; (d) transmitting the positioning of the hatch opening to the PLC; and in response to the transmission of the positioning of the hatch opening (e) aligning a loading spout assembly over the hatch opening.

In one aspect, the camera is coupled to a movable spout support or spout positioner that supports the loading spout assembly. The spout support moves the loading spout assembly and camera in a rectangular area referred to as the spout reach zone. The camera is aligned downwardly and angled towards the loading spout assembly to view the area below the center of the spout. The camera is mounted at the vehicle entry side of the spout support.

In another aspect, the method further includes calibrating the camera using training camera position data with respect to at least two opposite corners or ends of the spout reach zone, the at least two opposite ends include a home position and an initial hatch opening position of the spout support, and guiding the vehicle based on the calibration by providing an interface for displaying a signal or a massage, received from the PLC, to a driver of the vehicle.

In another aspect, the method further includes tracking the hatch opening through the images starting with a small initial finding region that locates a hatch opening as it first appears in the images, and then expanding this region as it moves towards the spout reach zone. This process of opening the finding zone as the hatch opening moves through the image reduces the possibility of false finding an open hatch in the spout reach zone when it is not qualified through the process of traveling to the spout reach zone.

In still another aspect, the method further includes rapid-triggering the camera to capture and analyze, by the camera, the plurality of images in real-time and measuring brightness levels of camera images at multiple locations to dynamically filter the camera images. This dynamic filtering method provides improved contrast between truck tops and open hatches. The filtering step also includes masking out of objects that would interfere with accurate hatch hole finding. The masking step includes expanding white areas in the image to over-write dark areas and then expanding dark areas to restore the original shapes of large objects. This step removes small objects from the image so they cannot interfere with system's performance.

In yet another aspect, the method further includes locating and tracking the hatch opening based on a difference between the average brightness level of the vehicle and a brightness level of the hatch opening, receiving, by the PLC, the positioning of the hatch opening, detecting that the vehicle is stopped by determining that the positioning remained unchanged for a predetermined period of time, and, in response to the detection that the vehicle is stopped, moving the loading spout assembly to a drop position.

In another aspect, the method includes qualifying the hatch opening by measured area and width using data tables with trained expected values. These values are trained during the system calibration process, which allows the system to dynamically adjust the vehicle's stopping position and/or automatic positioning of the loading spout assembly. The data tables are used with adjustable minimum and maximum limit settings to qualify the area and width results. These tables allow the system to more accurately qualify a hatch opening using dynamically changing criteria based on where the hatch opening is found in the images. These data tables are setup to dynamically adjust the expected area and width values as the measured vehicle height changes. Trucks of different heights are presented to the loading system and the truck height changes during the loading process as the vehicles are filled with product due to a compression of tires. The qualifying data tables generated to improve accuracy were created during the calibration step, in which the PLC, camera, vehicle height sensor and positioning of the spout support were calibrated together to train the expected values.

In yet another aspect, the method further includes providing a non-contact height measurement sensor, such as an ultra-sonic or laser distance sensor, for measuring a height of the vehicle and establishing, based on the measurement of the height of the vehicle, a horizontal positioning offset to the positioning of the hatch opening.

In still another aspect, the method further includes providing a LED lighting mounted to a movable spout support for providing an even illumination of a top surface of the vehicle.

Thus, the present invention provides an apparatus and method for effectively and efficiently delivering bulk material into an open hatch of a storage compartment of a bulk transport vehicle by automatically centering and precisely aligning the loading spout assembly over the open hatch of the vehicle by a programmable logic controller which receives precise positioning of the open hatch through the use of a calibrated, software enabled camera. Consequently, the iterative steps presently required in centering a conventional loading assembly over an open hatch of a vehicle are eliminated, and loading time and occurrences of misalignment are greatly reduced.

These and other objects, advantages, purposes and features of the present invention will become apparent upon review of the following specification in conjunction with the drawings.

DETAILED DESCRIPTION OF PREFERRED EMBODIMENTS

Figure 1:
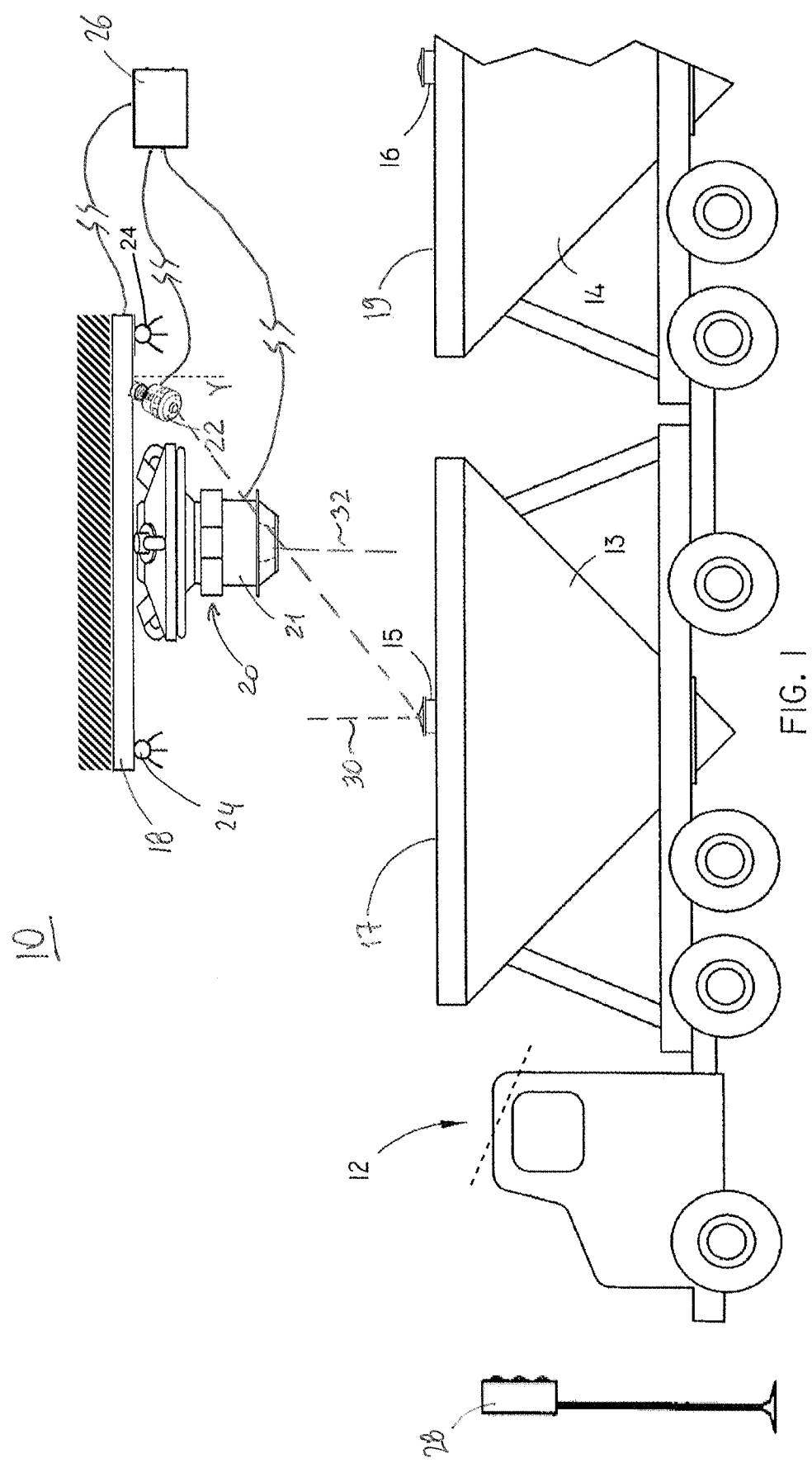
FIG. 1 is a side elevation view of a bulk loading system for delivering bulk material to a storage compartment of a bulk transport vehicle through a hatch opening, in accordance with the present invention.
Figure 2:
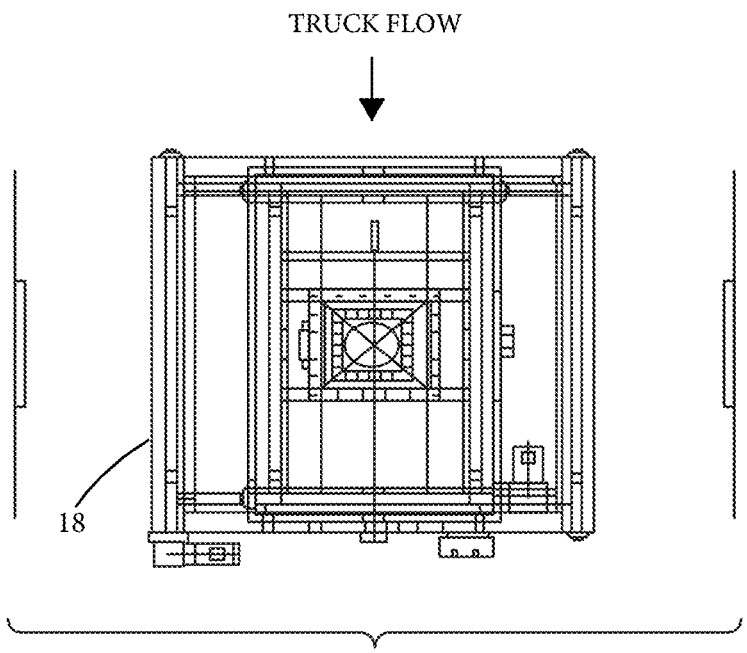
FIG. 2 is a top plan view of a bulk loading system similar to that of FIG. 1, with additional structures shown.

Referring now to the drawings and the illustrative embodiments depicted therein, a bulk loading system 10 is provided for automatically guiding a bulk transport vehicle 12 into a loading bay area to a stopping point, and automatically delivering bulk material to storage compartments 13, 14 of bulk transport vehicle 12 through respective hatch openings 15, 16, such as shown in FIG. 1. Bulk loading system 10 includes a positioner frame or spout support 18 (FIGS. 1-3A), a loading spout assembly 20 with a spout 21, an optional camera mount 23 secured to the spout assembly 20 (FIGS. 3A, 4A, and 4B), a camera 22, a programmable logic controller (PLC) 26, and a display 28 for displaying positioning data to a driver of vehicle 12. As will be described in more detail below, the various components of the bulk loading system 10 operate to facilitate efficient positioning of the vehicle 12 within the loading system 10 for loading bulk materials into the one or more storage compartments 13, 14 of the vehicle 12.

In the illustrated embodiment of FIG. 1, the bulk loading system 10 is shown positioned in a non-loading or "Home" position 32 above bulk transport vehicle 12 stationed in, or moving within, a loading bay. The bulk transfer vehicle 12 comprises a dual trailer truck which includes two storage compartments 13 and 14. Each storage compartment 13, 14 includes a respective fill opening 15, 16, such as a hatch, through which the material is loaded into the respective compartment 13, 14 of vehicle 12 by bulk loading system 10.

Spout support 18 is a movable platform adapted to support loading spout assembly 20, such as shown in FIGS. 1, 3, 3A, and 5, and is designed to move within a horizontal plane, thereby providing a lateral adjustment of positioning of loading spout assembly 20 with respect to fill openings 15, 16. Loading spout assembly 20 includes a spout 21, which may be an extendable/retractable spout designed to move up and down during vehicle movement and filling operations, thereby providing a vertical adjustment of positioning of loading spout assembly 20, for loading the material into vehicle 12 through openings 15, 16. Spout support or positioner frame 18 may also include lighting 24 mounted at the corners of the underside of the frame to provide even illumination of the compartments' 13, 14 top surfaces. For the purpose of providing lighting that is balanced around positioner frame 18, it is further envisioned that four large LED lights 24, with one light 24 mounted in each corner of positioner frame 18 (see FIG. 3), may be provided to give even lighting to the top surfaces of the compartments 13, 14. Optionally, additional lighting 24a may be provided to illuminate the vehicle 12 and compartments 13, 14.

Figure 3A:
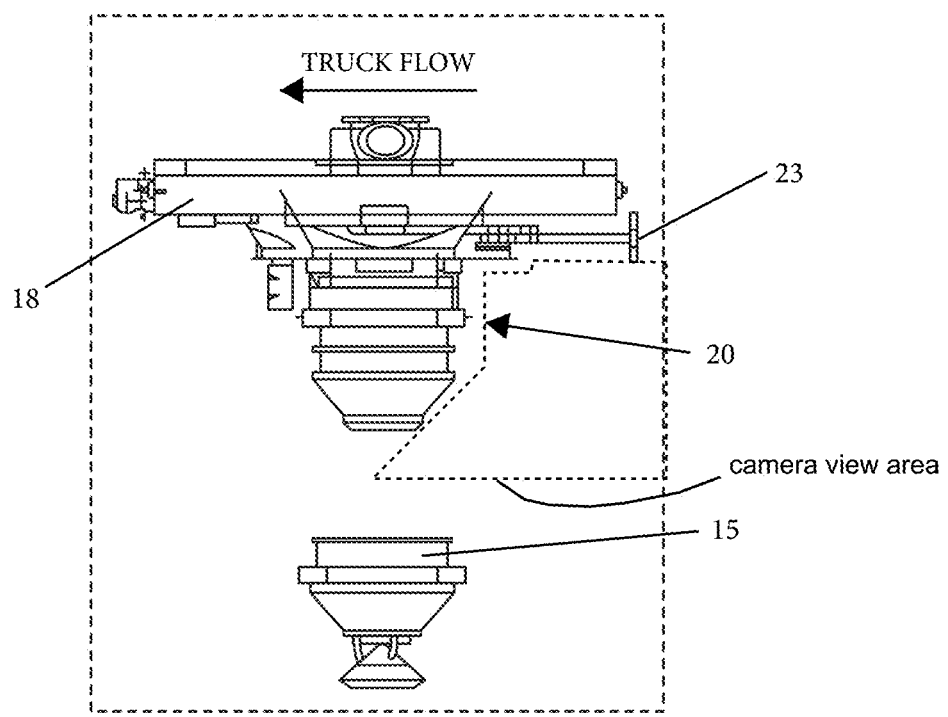
FIG. 3A is a left side elevation of portions of the bulk loading system and vehicle hatch generally in the region designated 3A in FIG. 3.
Figure 4A:
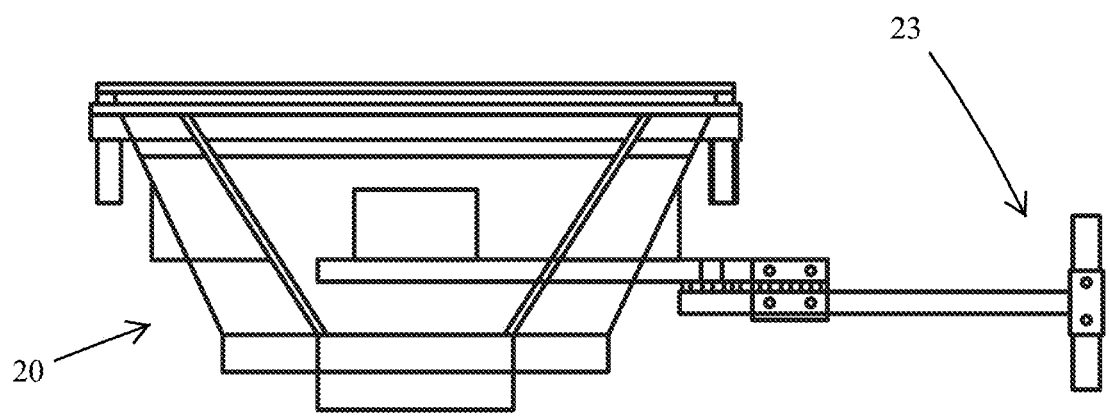
FIG. 4A is a left side elevation of a hopper portion with camera mount of the bulk loading system.
Figure 4B:
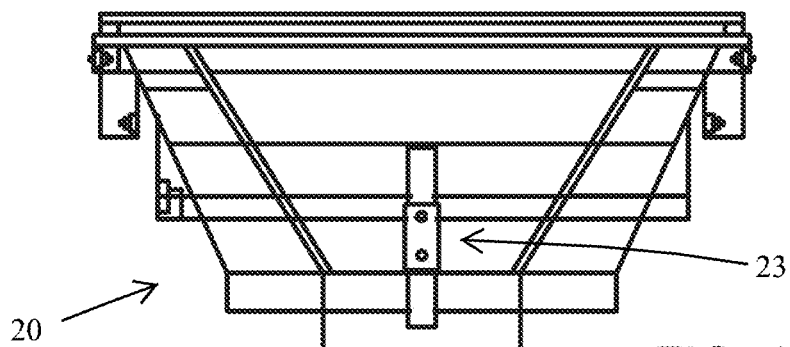
FIG. 4B is a rear elevation of the hopper portion and camera mount of FIG. 4A.
Figure 5:
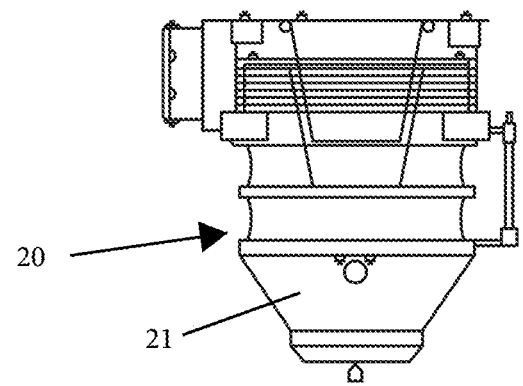
FIG. 5 is a left side elevation of the hopper portion and filling spout of the bulk loading system.

As best shown in FIGS. 1 and 3A, the camera 22 is mounted to spout support 18 and aimed or oriented at approximately a 30 degree angle from a vertical axis, pointing downward and toward loading spout assembly 20 Camera 22 is thus adapted to move horizontally with spout support 18 but, in the illustrated embodiments, does not move vertically when spout 21 moves up or down. Optionally, and as shown in FIGS. 3A, 4A, and 4B, camera mount 23 may be coupled to the loading spout assembly 20 and may move with the spout assembly.

Camera 22 may include both high performance hardware and software components, such as an area scan camera with charge-coupled device (CCD) or complementary metal-oxide-semiconductor (CMOS) imaging chips. The imaging chips are typically made of silicon with an array of pixels or picture elements. Each pixel has a value from 0 to 255, called grey scale. A gray scale value of "0" is black and a gray scale value of "255" is pure white. The software of camera 22 analyzes these pixel values to find and "qualify" features like a hatch opening, as will be described in more detail below. This software that is run on camera 22 is programmed using a remote computing device. Optionally, other variations of a software enabled area scan cameras are envisioned, without departing from the spirit and scope of the present invention. Optionally, for protection the camera may be mounted in a housing such as a stainless-steel protective enclosure with optical grade glass plate covering.

Spout support 18, loading spout assembly 20 and camera 22 are communicatively connected to a programmable logic controller (PLC) 26, which actuates and controls the movement of movable spout support 18 and extendable/retractable spout 21, based on data or information continuously received from camera 22 via Ethernet or discrete inputs and outputs. The data or information received by PLC 26 from camera 22 as an input is a response to an output transmitted by PLC 26 to camera 22, including a trigger and a test identification number. The input received by PLC 26 from camera 22 may include the pixel values, speed and/or direction of bulk transfer vehicle 12, direction of spout support or positioner frame 18, respective brightness levels of storage compartments 13, 14 and hatch openings 15, 16, and other results. It should also be understood that PLC 26 may be coupled to spout support 18 and loading spout assembly 20 via discrete I/O connections or Ethernet IP links. Optionally, the components of the system 10 may be connected electrically, via radio frequency (RF), or via any other suitable wireless communication technology.

It is also envisioned that PLC 26 is capable of supporting up to eight loading bays by communicating with up to eight cameras mounted in adjacent silo bays, although it will further be appreciated that the PLC and overall system may be scaled up or down to suit any particular application or size of operation, without departing from the spirit and scope of the present invention. Optionally, bulk loading system 10 may include a human machine interface (HMI) display (not shown) that could be used to calibrate the camera, adjust thresholds, enable features, reset cameras, and more. The HMI display is designed to communicate to PLC 26 and through the PLC 26 to camera 22 to provide user control and data monitoring.

Positioning data is shown at the display 28 for guiding the driver of vehicle 12 into and within the loading bay may include a large outdoor-rated high-definition (HD) video display system that a driver of vehicle 12 views as the driver drives into the loading bay. As camera 22 captures live video images and performs recognition steps to find and track the hatch hole(s), the live video images are processed and may be displayed, via display 28, with or without messages or signals to the driver in real-time, so that the driver can stop within a reach zone of the positioner frame 18. It is also envisioned that graphics overlaid on the camera-generated images may be plotted for the driver to view on the display 28. The graphics may include the target reach zone, a slow speed line, distance calipers, filtered images, driver instructions, station information and adjustable controls. The display 28 may include an electrical housing (not shown) for the display and a small remote electrical box (not shown) for an industrial computer that runs the camera software. This remote computer can be connected to the same Ethernet or other communications network that is setup between the camera and controls including the PLC 26.

Figure 3:
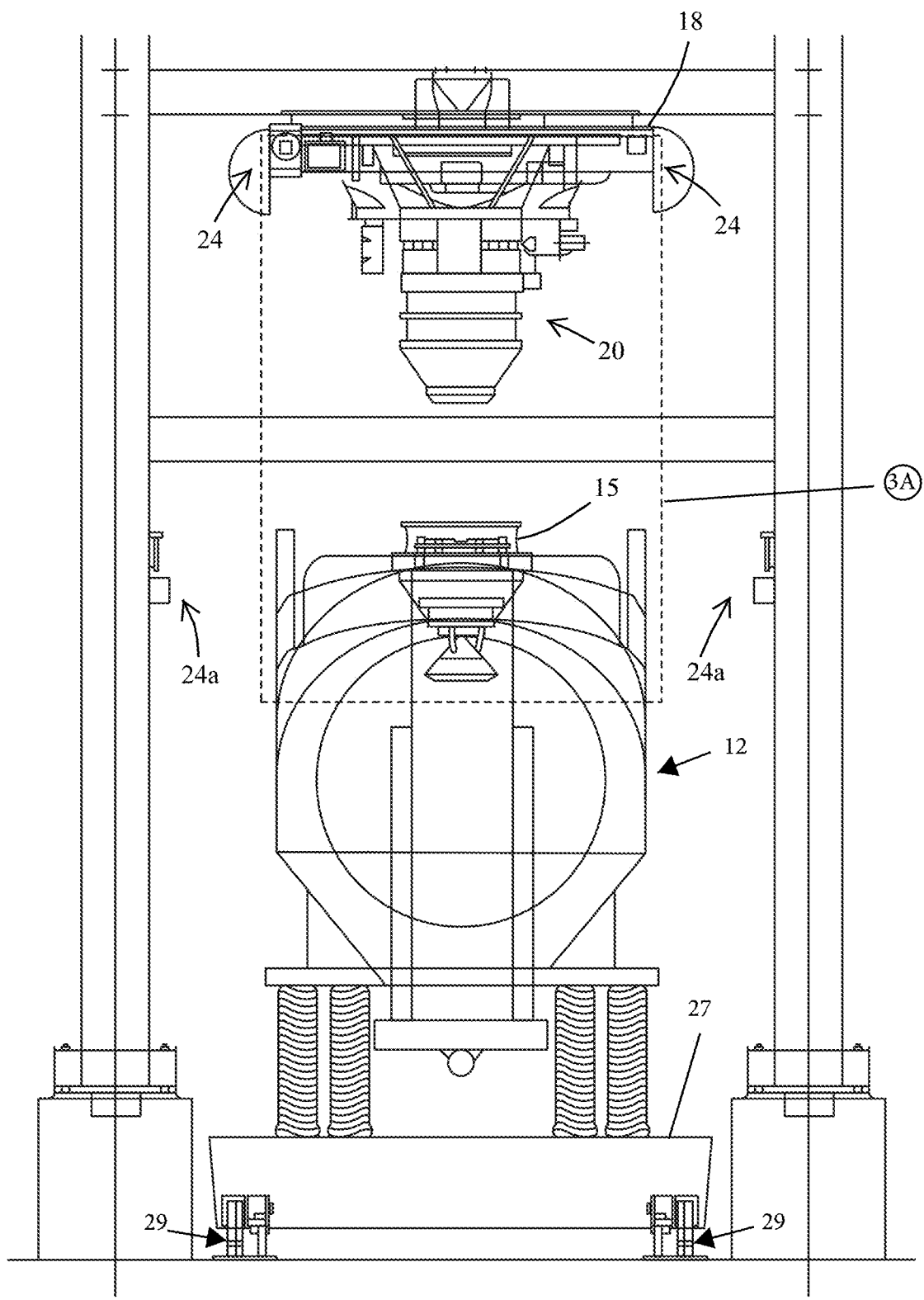
FIG. 3 is a rear elevation of the bulk transport vehicle and bulk loading system of FIG. 2, including the additional structures of FIG. 2.

Bulk loading system 10 may also include vehicle height measuring sensors (not shown). Although bulk transport vehicles have some natural height variations, only relatively significant variations in height of bulk transport vehicles may cause a concern for system 10, such as in the case with large, medium and small versions of transport vehicles. In the event that the height variation in bulk transport vehicles is significant, and since the angular alignment of camera 22 to the vertical alignment of spout 21 has been predetermined through a calibration of camera 22, a positive or negative offset in estimating the exact positioning of the hatch opening may be required to compensate for the variation from an expected intersection height. It is thus contemplated by the invention that an ultra-sonic sensor may be used to measure height data of the transport vehicles, which would be used by system 10 to calculate an offset distance in the direction of the truck movement. It is further contemplated that the horizontal offset distance is equal to the "height difference" times the tangent of 30 degrees, which is based on camera 22 being mounted at a 30 degree angle from the vertical axis. Optionally, and as shown in FIG. 3, the vehicle 12 may be supported on a vertically adjustable support pad 27 that includes powered lift actuators 29 for raising or lowering the storage compartments 13, 14 and hatch openings 15, 16 to a suitable height.

In order to locate fill openings 15 or 16, camera 22 of bulk loading system 10 continuously captures images of vehicle 12 (including one or more storage compartments 13, 14) and determines, based on its previously conducted calibration and a measured average brightness level of an upper surface 17 or 19 of storage compartments 13 or 14, the respective locations of fill openings 15, 16 of vehicle 12, as will be more fully explained below.

In order to most effectively implement bulk loading system 10 to automatically guide vehicle 12 into a loading bay area and deliver bulk material into storage compartments 13, 14 of vehicle 12, camera 22 is calibrated to establish a proper alignment of camera 22 to a known hatch hole position, and thus provide accurate positioning of positioner frame 18 and spout 21 relative to a hatch opening 15 or 16 when a given vehicle is moved into the system 10. The calibration process saves/stores positioning data obtained and analyzed by the camera from the images captured by the camera. The positioning data include truck height and where a hatch opening is located in the camera image when the positioner frame 18 is at the reach zone corners, positioner frame's 18 home position, and when spout 21 is perfectly aligned with the hatch opening 15 or 16. The calibration process also includes setting up a pixel-to-millimeter relationship used to calculate positioning offsets created by variations to the vehicle height changes. The calibration process involves training four key positions in the software program of camera 22, as described below.

The first half of the calibration process starts with determining the first key position, which is a spout drop position indicated by a central vertical axis 30 of the hatch opening 15 or 16. To determine the spout drop position 30, spout 21 is accurately centered and positioned in a hatch opening (for example, hatch opening 15). Next the spout 21 is retracted from hatch opening 15 and the camera 22 captures at least one image (where spout 21 appears in camera's view when spout is retracted) of hatch opening 15 to analyze, determine and save X/Y coordinates for the center of hatch opening 15. Next, X/Y coordinates for the center of hatch opening 15 are determined for the second key position, which is a "Home" position 32 of positioner frame 18. To accomplish this, positioner frame 18 is moved to the "Home" position, which was previously determined by a first set of sensors (not shown) of positioner frame 18 detecting when the left-to-right motion is centered and a second pair of sensors (not shown) of positioner frame 18 detecting when the front-to-back motion is centered, although these alignments can also be performed manually. The positioner sensors determine when positioner frame 18 is at "Home" so that camera 22 can capture at least one image and save the position (X/Y coordinates) of the image(s) (center of opening 15) for the "Home" position 32. Upon completion of the above procedure, camera 22 and the hardware of positioner frame 18 are calibrated together to recognize and store where "Home" position 32 is located in the image, and where the hatch opening of the vehicle is located relative to that expected "Home" position 32. Once the relationship of the first key position relative to the second key position is established/trained, using images of camera 22, PLC 26 of system 10 is now able to calculate where a hatch opening of a bulk transport vehicle is relative to the expected "Home" position 32. Thus, whenever a bulk loading vehicle (for example, vehicle 12) drives into the loading bay, this relationship allows system 10 to determine where the center of a hatch opening (for example, opening 15) is expected to be when positioner is at the "Home" position 32 so that system 10 can move spout 21 to the trained spout drop position 30 (the first key position) when the vehicle is fully stopped in the loading bay.

The second half of the calibration process involves training the "Reach Zone" of positioner frame 18. Positioner frame 18 is designed to move horizontally the same distance from the home position in the left, right, forward and backward directions. The size of the reach zone will vary based on the storage compartment of the vehicle and historical data (repeatability) of the vehicle positioning. Once the spout drop position 30 and "Home" position 32 are trained, the calibration process proceeds to train the third and fourth key positions of camera 22 by (i) moving positioner frame 18 to one corner of the reach zone of positioner frame 18, thereby training camera 22 in that position (in X/Y coordinates) for the center of hatch opening 15, and (ii) moving positioner frame 18 to the opposite corner of the reach zone of positioner frame 18, thereby training camera 22 in that position (in X/Y coordinates) for the center of hatch opening 15.

PLC 26 coordinates the first and second sets of sensors of positioner frame 18 for the four key positions together with the image capturing by camera 22 during the training/calibration process, i.e. PLC 26 moves positioner frame 18 to the designated positions and transmits trigger signals or code to camera 22 in order for camera 22 to capture images. The code sent from PLC 26 to camera 22 configures camera 22 in the calibration mode such that the position values for the captured images are trained. Once PLC 26 cuts off or ceases to transmit the codes for calibration, camera 22 stores these calibrated/trained positions for guidance of vehicle 12 and positioner frame 18.

Camera 22 stores all the calibration information using the trained positions to define image graphics for the driver to be displayed on display 28. Camera 22 also transmits position (s) of hatch opening 15 to controller 26 for controlling movements of positioner frame 18. The camera's plotted graphics, shown on the display 28, guides the vehicle's operator to move the vehicle to the stopping point within the positioner's reach zone. At this point PLC 26 moves positioner frame 18 to the spout drop position 30 based on movement commands that the camera sends based on the calibrated positions. Having trained camera 22 for these four image positions, system 10 displays an image of the positioner's reach zone on display 28 so the driver can stop his or her bulk transport vehicle 12 in the loading bay so that positioner frame 18 would be capable of reaching a hatch opening to drop spout 21 into opening 15. This calibration process ties the sensors of positioner frame 18 to images of camera 22, and ultimately to the driver using plotted image graphics.

The calibration process requires that the height of the bulk transport vehicles stay relatively consistent because camera 22 views hatch opening 15 at a 30 degree angle such that this angled line or plane intersects the drop line or drop spout position 30 of spout 21. To accommodate bulk transport vehicles of varying heights, a height measurement sensor (not shown) is added to bulk loading system 10 in order to calculate a value for a vertical height change from the trained height distance. This value may be used by system 10 to calculate a horizontal "offset" value that may be utilized to add to or subtract from the trained coordinates of spout drop position 30. It should also be understood, however, that the height of each hatch opening 15 may be adjusted for by raising or lowering the adjustable support pad 27 with the lift actuators 29. As previously described, bulk loading system 10 provides for a dual functionality—the first is vehicle 12 or driver guidance to stop vehicle 12 within the reach zone of positioner frame 18; the second is automatic guidance of positioner frame 18 and spout 21 to place the spout into hatch opening 15 of the fully stopped vehicle 12. During the driver guidance, camera 22 stays at the "Home" position 32 so that, based on the four trained points, the current reach zone of positioner frame 18 is visible to the driver. Once vehicle 12 is guided by system 10 to a stopping point, positioner frame 18, controlled by PLC 26, moves loading spout assembly 20 and camera 22, also based on the calibration, to the expected spout drop position 30.

The system 10 is able to "qualify" and "dynamically track" hatch openings 15 or 16 during vehicle positioning. To accomplish this, camera 22 is triggered to capture images in rapid succession inspecting every image for the hatch opening's area, width and position values. For example, camera 22 analyzes every image at about 100 milliseconds per image, or about 10 images per second. It should be apparent that the continuous image capturing and analysis is essentially a "video" capture, and that controlling/displaying these images for vehicle 12 guidance as fast as the images are captured may be considered a "real-time video."

To facilitate the dynamic "qualification" and "tracking" of a hatch opening, the brightness level of the vehicle's top surface 17 or 19 of storage compartment 13 or 14 is measured at three different locations in the image(s) of storage compartment 13 or 14. The two regions with the highest brightness levels are used to set a brightness level of, for example, upper surface 17 of vehicle 12, with a lowest brightness value being ignored because it may correspond to the hatch opening 15, which is relatively dark compared to upper surface 17. The regions searched for the brightness level of the upper surfaces are spread out enough so that hatch opening 15 can never be in two regions at the same time. The detection in brightness levels between openings 15, 16 and upper surfaces 17, 19 may optionally be increased by lights 24. The average brightness level of the two brightest regions are used to set the threshold of a binary image filter. This dynamically changing threshold creates a consistently high contrast image with changing image brightness levels caused by day and night inspection conditions.

To confirm or qualify that a hatch opening 15 is actually found, camera 22 first searches in a small finding region for a hatch opening with an expected size (area) and an expected width (distance) based on lookup table data. When the camera finds an acceptable hatch opening based on defined criteria and the rest of the image has an acceptable brightness level, the initial hatch opening finding region 15 is expanded to track the hatch opening deeper into the camera image. The expected size of a hatch opening may be previously established based upon a trained table of expected values at multiple locations across the camera image as the hatch opening moves through the images capture by camera 22 during movement and positioning of the compartment 13. The trained values are then used to "qualify" the hatch opening 15 resulting in the opening up or expanding of the search region as the hatch opening moves through the images. Camera 22 uses measured brightness levels of light reflecting off the truck surface 17, 19 to create high contrast images and then the camera program uses object recognition tools inside the camera software to find the hatch opening 15, 16. These object recognition tools are used to measure the area and width of the hatch opening. System 10 then qualifies that the hatch opening 15 is found using the trained table of expected values for the surface area of the opening, as the opening moves through the images of camera 22. It should be appreciated that images of the fill opening 15 depict the fill opening 15 as becoming smaller, flatter, and more oval as the fill opening moves through the images and away from the camera, in part because the images are captured at a 30 degree angle from the vertical axis. This "qualification" by using the trained table of expected values for the surface area of the hatch opening is a key factor in the ability of the system to track fill openings through the image.

Once vehicle 12 enters the loading bay area and hatch opening 15 or 16 is "qualified", camera 22 begins to track the hatch opening 15. Camera 22 tracks hatch opening 15 into the spout reach zone by using an inside target area that is slightly smaller than the hatch opening 15, and tracks the hatch opening 15 of vehicle 12 exiting the spout reach zone using a slightly larger target area, thereby creating a "buffer zone". This "buffer zone" for tracking is implemented by system 10 so that vehicle 12 cannot stop with the center of hatch opening 15 on the boundary of the reach zone region. Without the "buffer zone", proper positioning of vehicle 12 may be inconsistent, occasionally causing vehicle 12 to stop near the boundary of the target reach zone.

System 10 is configured to identify or measure when vehicle 12 is fully stopped before switching from vehicle-guidance to positioner-guidance to the expected spout drop position 30. To detect when vehicle 12 is fully stopped, PLC 26 first identifies that, for example, hatch opening 15 is in the spout reach zone, and then PLC 26 begins to dynamically receive from camera 22 tracked X/Y coordinates of hatch opening 15 and re-check that position of hatch opening 15 every three to four seconds. When camera 22 detects that hatch opening 15 is in the same (unchanged) position (within a standard tolerance) for three to four seconds, PLC 26 moves positioner frame 18 to align spout assembly 20 with spout drop position 30 and allows or directs the spout 21 to automatically drop into hatch opening 15. Thus, system 10 continually captures images in rapid succession and analyzes these images to qualify and track the hatch opening through the image until the driver stops vehicle 12 in the positioner reach zone. Once system 10 verifies vehicle 12 is stopped, PLC 26 guides positioner frame 18 to an expected stop position based on the calibration, as described above.

Figure 6:
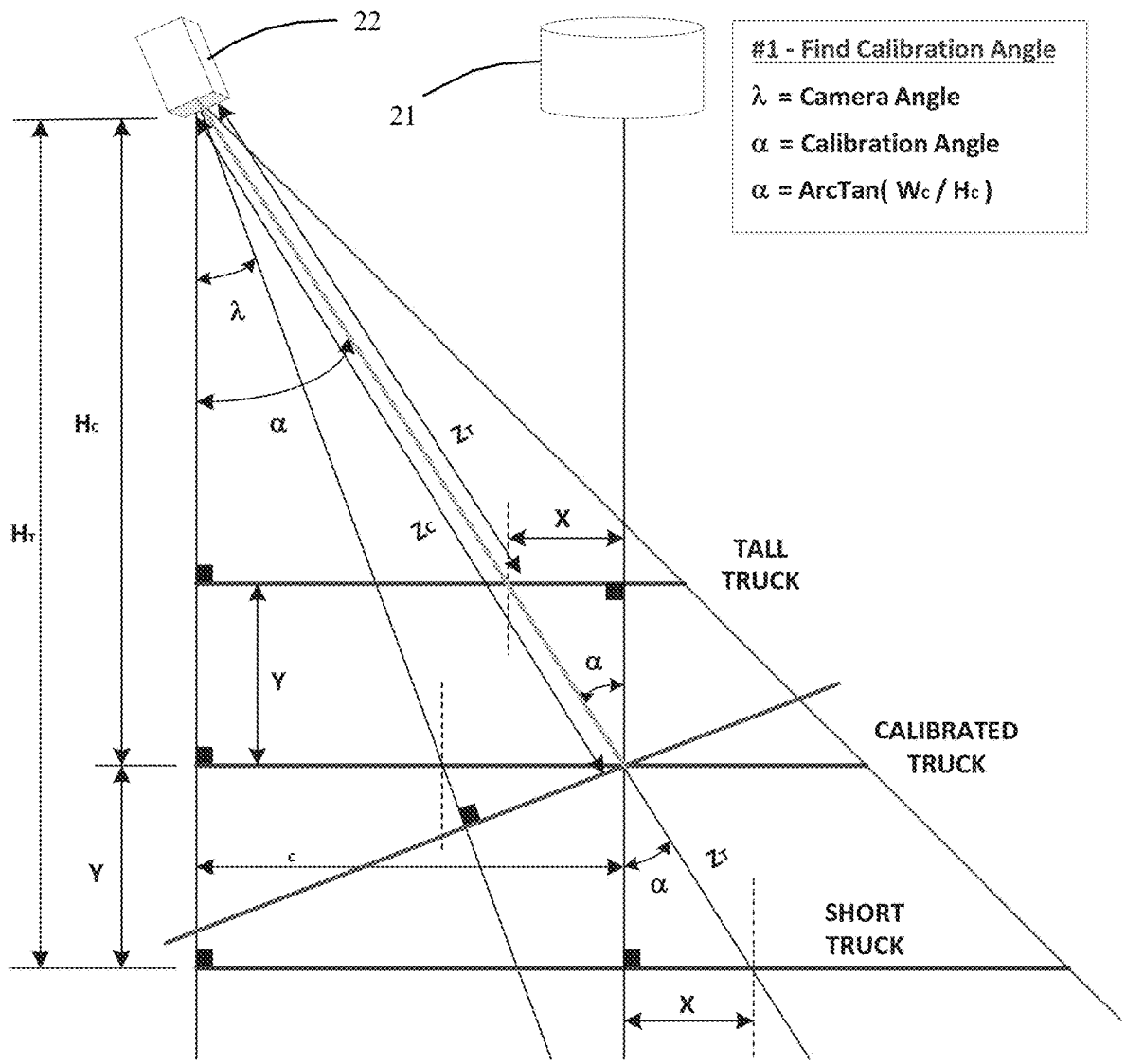
FIG. 6 is diagram of a camera and loading spout of the bulk loading system illustrating offset and scaling calculations for different truck or tank heights.

Various angle and distance measurements that are measured and calculated by the system 10 may be more fully understood with reference to FIG. 6. $\lambda$ refers to the angle that the camera 22 is aimed relative to vertical, and the calibration angle $\alpha$ is calculated as the arctangent of the lateral offset distance $W_C$ of a calibrated truck's hatch opening relative to the camera lens divided by the height distance $H_C$ of a calibrated truck's hatch opening relative to the camera lens ($\alpha$=ArcTan ($W_C/H_C$)). Camera offset X is the lateral distance between where the center of the camera's viewpoint falls at the truck's hatch opening height, and the center of the hatch opening, where X=0 for a calibrated truck. The difference Y between a given truck's hatch opening height and that of a calibrated truck's hatch opening is calculated as the height distance of the given truck's hatch opening height $H_T$ minus the height distance $H_C$ of the calibrated truck's hatch opening. The Camera offset X may be calculated as Y*Tan ($\alpha$) or as ($H_T$–$H_C$)*Tan (ArcTan ($W_C/H_C$)). Finally, the camera scale factor may be calculated as the different between the distance $Z_C$ between the camera lens and the center of the hatch opening for a calibrated truck, and the distance $Z_T$ between the camera lens and the center of the hatch opening for a given truck, divided by the distance $Z_C$ (camera scale factor=($Z_C$–$Z_T$)/$Z_C$). The distance $Z_C$ may be calculated as the square root of $H_C^2$ plus $W_C^2$ ($Z_C$=SRT($H_C^2$+$W_C^2$)), and the distance $Z_T$ may be calculated as the square root of $X^2$ plus $Y^2$ ($Z_T$=SRT($X^2$+$Y^2$)). The scale factor is equal to one if the hatch opening height of a given truck is equal to that of a calibrated truck. The scale factor is greater than one for trucks with hatch opening heights that are greater than that of a calibrated truck, and less than one for trucks with hatch opening heights that are less than that of a calibrated truck.

Thus, the bulk loading system of the present invention provides highly accurate positioning of bulk material vehicles within a loading zone, while providing easy-to-follow guidance for vehicle operators and automated positioning adjustments so that a given vehicle's time within the loading zone is minimized. A vehicle with multiple storage compartments can be directed to move forward and stop again at a new position, in succession, for each compartment to be filled, with relatively little time spent repositioning the vehicle and storage compartments. The reduction in positioning time increases the productivity of the filling facility, by reducing the time that each vehicle spends within the facility for loading purposes.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A hulk loading system for delivering hulk material to a storage compartment of a hulk transport vehicle through a hatch opening, the bulk loading system comprising:
   a movable spout support adapted to move in at least two horizontal directions of movement for centering said spout support over the hatch opening of the storage compartment;
   a loading spout assembly supported by said spout support and adapted to move in two vertical directions of movement;
   a camera coupled to said spout support for capturing and analyzing a plurality of images in real-time to identify a current position of the hatch opening of the storage compartment, wherein said camera is configured to:
   (1) be rapid-triggered;
   (2) measure a brightness level in a plurality of locations of the storage compartment to determine an average brightness level for at least two of the locations with a brightest level; and
   (3) dynamically set a binary image filter threshold for the average brightness level of the storage compartment; and
   a programmable logic controller (PLC) communicatively coupled to said spout support, loading spout assembly and camera, and configured to actuate (i) said spout support for centering over the hatch opening of the storage compartment and (ii) said loading spout assembly for filling the storage compartment with the bulk material.

2. The bulk loading system of claim 1, further comprising an interface, wherein said interface is configured to display a signal or a message received from said PLC to a driver of the vehicle.

3. The bulk loading system of claim 1, wherein said camera extends downwardly at an angle from said spout support and is aimed towards said loading spout assembly.

4. The bulk loading system of claim 1, wherein said camera, in response to an input received from said PLC, is configured to analyze the plurality of images captured by said camera for identifying when the hatch opening of the storage compartment moves within a predetermined range of reach of said spout support.

5. The bulk loading system of claim 4, wherein said camera and PLC are configured to cooperate for analyzing and determining, respectively, that the hatch opening is no longer moving, and wherein said PLC estimates, based on the determining, at least one of the horizontal directions of movement of said spout support.

6. The bulk loading system of claim 1, wherein said camera is configured to (i) locate and track the hatch opening by capturing and analyzing a real-time video imaging and (ii) dynamically transmit to said PLC a positioning of the hatch opening, and wherein the video imaging is generated by rapid-triggering said camera to capture the plurality of images.

7. The bulk loading system of claim 6, wherein said PLC is configured to dynamically receive the real-time video imaging, determine that the positioning of the hatch opening remains unchanged for a predetermined period of time, and, based on the determination, actuate said spout support in-a at least one of the horizontal directions of movement.

8. The bulk loading system of claim 1, wherein said camera comprises an object recognition tool for measuring a surface area of the hatch opening and software for analyzing the plurality of images in real-time.

9. The bulk loading system of claim 1, further comprising:
   a light mounted onto a bottom side of said spout support and aimed at the storage compartment; and
   a sensor for measuring a height of the storage compartment.

10. The bulk loading system of claim 1, wherein said PLC is configured to send an output to said camera and receive an input from said camera, the output comprising a trigger signal or a test identification number, and the input comprising at least one of: a speed of the vehicle, a direction of the vehicle, a direction of movement of said spout support, and brightness level.

11. A method for delivering bulk material to a storage compartment of a bulk transport vehicle through a hatch opening, the method comprising the steps of:

providing a camera with a software and object recognition capability, the camera being communicatively coupled to a programmable logic controller (PLC);

capturing by the camera a plurality of images of the storage compartment by rapid-triggering the camera;

measuring a brightness level in a plurality of locations of the storage compartment to determine an average brightness level for at least two locations with a brightest level; and dynamically setting, by the camera, a binary image filter threshold for the average brightness level of the storage compartment;

analyzing by the camera the plurality of images in real-time to identify a current position of the hatch opening of the storage compartment;

transmitting the current position from the camera to the PLC; and in response to said transmitting, aligning a loading spout assembly over the hatch opening.

12. The method of claim 11, wherein the camera is coupled to a movable positioner frame supporting the loading spout assembly, and wherein the camera extends downwardly from the positioner frame and is aimed towards the loading spout assembly.

13. The method of claim 12, further comprising calibrating the camera with respect to at least two opposite ends of a reach zone of the positioner frame, wherein the at least two opposite ends comprise a home position and an initial hatch opening position of the positioner frame.

14. A method for delivering bulk material to a storage compartment of a bulk transport vehicle through a hatch opening, the method comprising the steps of:

providing a camera with a software and object recognition capability, the camera being communicatively coupled to a programmable logic controller (PLC);

calibrating the camera with respect to at least two opposite ends of a reach zone of a positioner frame supporting a loading spout assembly, wherein the at least two opposite ends comprise a home position and an initial hatch opening position of the positioner frame;

capturing by the camera a plurality of images of the storage compartment;

analyzing by the camera the plurality of images to identify a current position of the hatch opening of the storage compartment;

transmitting the current position from the camera to the PLC;

in response to said transmitting, aligning the loading spout assembly over the hatch opening; and tracking the hatch hole into the reach zone using a smaller target area and exiting the reach zone using a larger target area.

15. The method of claim 13, further comprising guiding the vehicle based on said calibrating by providing an interface for displaying a signal or a message, received from the PLC, to a driver of the vehicle.

16. The method of claim 14, further comprising:

rapid-triggering the camera to capture and analyze, by the camera, the plurality of images in real-time;

measuring a brightness level in a plurality of locations of the storage compartment to determine an average brightness level for at least two locations with a brightest level; and dynamically setting, by the camera, a binary image filter threshold for the average brightness level of the storage compartment.

17. The method of claim 16, further comprising locating and tracking the hatch opening based on a detected difference between the average brightness level of the storage compartment and a brightness level of the hatch opening.

18. The method of claim 11, further comprising:

receiving, by the PLC, the position of the hatch opening;

detecting that the vehicle is stopped by determining that the position remains unchanged for a predetermined period of time; and in response to said detecting, moving the loading spout assembly to a drop position.

19. The method of claim 11, further comprising validating that the hatch opening has been correctly identified based on a table of expected values for a surface area and a width of the hatch hole.

20. The method of claim 11, further comprising:

measuring a height of the storage compartment using a sensor;

establishing a horizontal position offset to the identified current position of the hatch opening based on said measuring the height of the storage compartment; and calibrating the camera according to the horizontal position offset to compensate for a variation in the height of the storage compartment relative to an expected height.

21. The method of claim 11, further comprising providing lighting mounted to a movable positioner frame for providing an even illumination of a top surface of the storage compartment.

* * * * *

UNITED STATES PATENT AND TRADEMARK OFFICE
CERTIFICATE OF CORRECTION

| | | |
|---|---|---|
| PATENT NO. | : 11,286,123 B2 | Page 1 of 1 |
| APPLICATION NO. | : 16/904887 | |
| DATED | : March 29, 2022 | |
| INVENTOR(S) | : Reinhard Matye and Richard S. Anderson | |

It is certified that error appears in the above-identified patent and that said Letters Patent is hereby corrected as shown below:

In the Claims

Column 11, Claim 1:
Lines 53-54, "A hulk loading system for delivering hulk material to a storage compartment of a hulk transport" should be --A bulk loading system for delivering bulk material to a storage compartment of a bulk transport--

Column 12, Claim 7:
Line 47, delete "-a" after --in--

Signed and Sealed this
Twenty-fourth Day of June, 2025

Coke Morgan Stewart
*Acting Director of the United States Patent and Trademark Office*